March 1, 1960   G. L. ROWE ET AL   2,926,926
LAWN MOWER
Filed July 1, 1958

George L. Rowe,
Herbert P. Spindler, INVENTORS.

BY
Attorney

United States Patent Office 2,926,926
Patented Mar. 1, 1960

2,926,926

LAWN MOWER

George L. Rowe and Herbert P. Spindler,
Los Angeles, Calif.

Application July 1, 1958, Serial No. 745,937

4 Claims. (Cl. 280—43.2)

Our invention relates to lawn mowers of the type embodied in our copending application Serial No. 734,038, filed May 8, 1958, and which is characterized by a mechanism for manually adjusting all four wheels of the mower simultaneously to, in turn, effect vertical adjustment of the grass-cutting element of the mower whereby grass can be mowed to any predetermined height desired.

As a part of this wheel-adjusting mechanism each wheel has its axle mounted for vertical adjustment in a vertical frame or sleeve fixed on the mower chassis, the axle having fixed thereto a member of angular form which is adjustable vertically in the frame by a screw shaft that is rotatable in either direction to move the member upwardly or downwardly and thereby effect vertical adjustment of the axle and its wheel on the chassis.

It has been found that, due to the weight of the mower chassis as imposed on each wheel, the member is caused to bind in the frame thus rendering vertical adjustment thereof extremely difficult. Additionally, it produces a tendency for the wheel axle to tilt causing the wheel to scrape against the frame.

It is a purpose of our present invention to provide means for stabilizing the axle-carrying member in the frame so that it cannot bind in its movement therein, and therefore is readily adjustable to effect easy vertical adjustment of the wheel. Also, the aforesaid stabilizing means is effective to hold the wheel axle against tilting in any position of vertical adjustment, and thus it is maintained in a plane perpendicular to the plane of the frame, and the wheel in a plane parallel to the plane of the frame to prevent scraping of the wheel against the frame.

It is also a purpose of our invention to provide means in association with the member and frame for visibly indicating the degree of vertical adjustment of the member in the frame which, in turn, indicates to the user the degree of vertical adjustment of all four wheels of the mower on the chassis, and, hence the vertical adjustment of the grass-cutting element so that in accordance therewith grass can be mowed to a desired height.

We will describe only one form of lawn mower including, one form of wheel-adjusting mechanism, one form of stabilizing means for the wheel-adjusting mechanism, and one form of means for visibly indicating the degree of adjustment of the wheel, each of said means embodying our invention.

Figure 1:
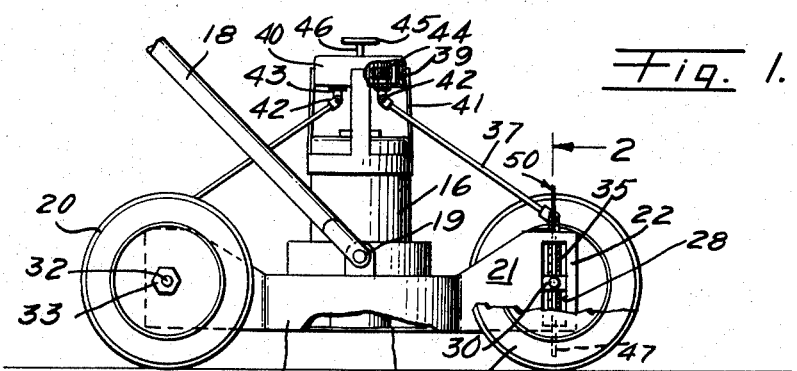
Fig. 1 is a view showing in side elevation one form of mower with portions thereof broken away, and having incorporated therein one form of wheel-adjusting mechanism, one form of stabilizing means, and one form of wheel-adjustment indicating means.
Figure 2:
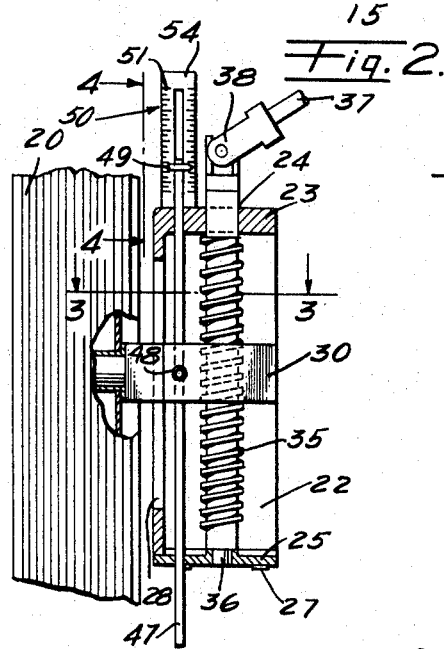
Fig. 2 is an enlarged vertical sectional view taken on the line 2—2 of Fig. 1.

Referring more particularly to the drawings, our invention is embodied in a mower of the type disclosed in our aforesaid pending application, and wherein a chassis 15 is provided upon the top side of which is mounted an electric motor 16 for driving a conventional grass-cutting element 17 rotatable about a vertical axis and exposed to the bottom side of the chassis. A conventional handle 18 is pivotally mounted as at 19 on the chassis 15 to push and guide the mower in its use on a lawn.

The chassis 15 is supported for rolling movement by four wheels 20, and these wheels are individually mounted on the chassis for adjustment vertically in order to vary the vertical position of the chassis and, in turn, the vertical position of the cutting element 17 so that grass can be cut to a length determined by such adjustment of the cutting element.

Figures 3, 4, 6, 7:
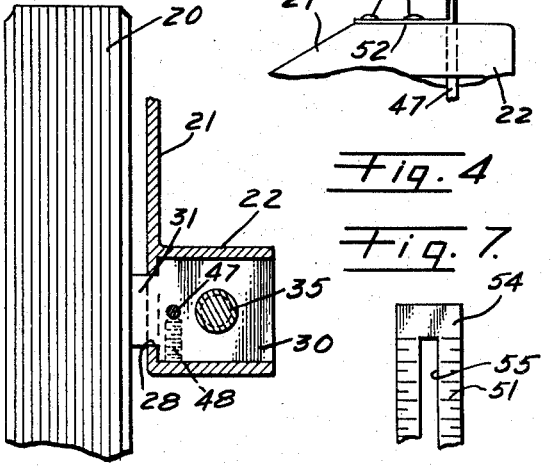
Fig. 3 is a horizontal sectional view taken on the line 3—3 of Fig. 2.
Fig. 4 is an elevational view taken on the line 4—4 of Fig. 2.
Fig. 6 is a detail perspective view of the scale-bearing bracket.
Fig. 7 is an enlarged elevational view taken on the line 7—7 of Fig. 4.
Figure 5:
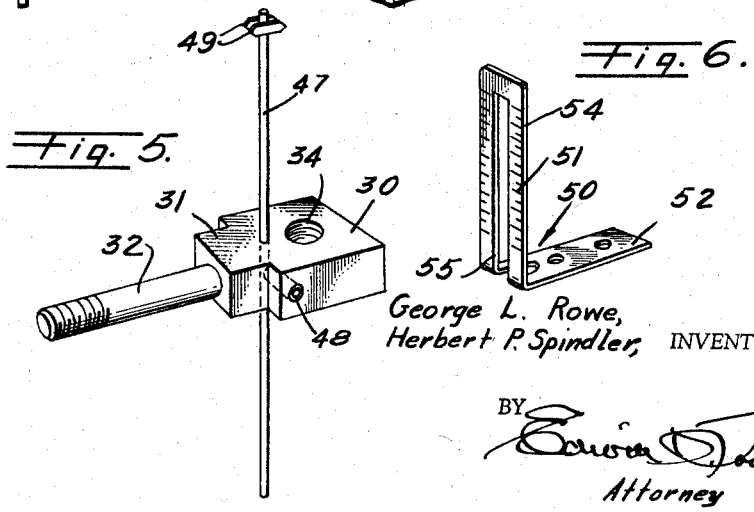
Fig. 5 is a perspective view showing the wheel axle, the adjusting member or block, and the stabilizing rod.

The mounting for each wheel 20 comprises an arm 21 rigidly fixed to the chassis 15 at one corner thereof, so as to project forwardly or rearwardly therefrom as the case may be, and disposed in a vertical plane. The free end of the arm 21 is formed with a vertically disposed frame or sleeve 22 permanently closed at its upper end by a wall 23 formed with an opening 24, while its lower end is open but closed by a plate 25 secured thereto by bolts 27. As shown in Fig. 3 the sleeve 22 is of U-form in cross section, and the closed side thereof is formed with a slot 28, while its opposite side is completely open to gain access to the parts therein for lubrication and other purposes.

Slidable vertically within the sleeve 22 is a block-shaped member 30 having a reduced extension 31 movable lengthwise in the slot 28, and formed with an axle 32 upon which the wheel 20 is journalled and retained by nut 33. The member 30 is formed with an opening 34 which is screw-threaded to receive a worm shaft 35 which, at its lower end, is formed with a reduced extension 36 journalled in the plate 25. The upper end of the shaft 35 extends upwardly through the opening 24 where it is connected to one end of a shaft 37 by a universal joint 38.

The above-described wheel mounting affords vertical adjustment of the wheel 20 on the arm 21 through rotation of the worm shaft 35 by the shaft 37 to cause the member 30 to move upwardly or downwardly within the sleeve 22 according as the shaft is rotated in one direction or the other. As a consequence, the axle 32 is moved vertically in one direction or the other so as to lower or elevate the wheel in relation to the arm.

As shown in Fig. 1, the mechanism for adjusting all four wheels of the mower simultaneously of course, includes all shafts 35 and 37, but in addition thereto a manually operable mechanism which is identical to the mechanism for manually operating like shafts as disclosed in our aforesaid application. Therefore, a brief showing and description of such mechanism in the present case is believed to suffice. The mechanism comprises an internal ring gear 39 rotatable in a housing 40 supported on the motor 16 by a frame 41.

By a universal joint 42, the upper end of each shaft 37 is connected to a short shaft 43 which is journalled in the bottom of the housing 40. On the upper end of the shaft 43 is fixed a gear 44 that constantly meshes with the internal gear 39.

A handle 45 of wheel form is fixed on the upper end of a shaft 46, the lower end of the shaft being fixed axially to the gear 39 so that by rotation of the shaft through the handle the gear can be rotated in one direction or the other. Under such rotation, the gear 39 rotates all four gears 44 to, in turn, rotate the shafts 43 and thereby actuate all four shafts 37 to rotate all four screw shafts 35. As a consequence, all four members 30 can be simultaneously adjusted vertically in the sleeves 22 to effect vertical and identical adjustment of all four wheels 20.

The stabilizing means for each wheel mounting constituting our invention comprises an element 47 which is movable in opposite ends of the sleeve 22, but is fixed to the block member 30. In the present instance, this element 47 is in the form of a rigid rod that has its upper end slidable through the wall 23 and its lower end slidable in a suitable opening in the plate 25. The intermediate portion of the rod 47 extends through the member 30 at one side of the opening 34, and is fixed therein by a suitable screw 48.

The rod 47, as so associated with the sleeve 22, plate 25 and member 30, is movable with the member in any vertical adjustment of the latter, and at the same time is held by the sleeve and the plate 25 against any lateral flexing thereof, so as to provide a rigid guide for the member. Under the weight of the mower chassis and its appurtenances as imposed on the wheels, and particularly when the wheels are not resting on level ground, there is a normal tendency of the member 30 and the sleeve 22 to twist or turn relatively causing the member to so bind in the sleeve as to resist movement of the member vertically and thus render adjustment thereof extremely difficult.

The rod 47 in providing a rigid guide for the member 30 stabilizes it against any tendency to turn relatively to the sleeve and thus binding of the member in the sleeve is prevented to insure free and unrestricted adjustment of the member vertically in the sleeve under rotation of the shaft 35.

In so stabilizing the member and sleeve, the axle 32 is prevented from tilting from a perpendicular position in relation to the sleeve so that the wheel cannot tilt and thus cause it to scrape against the sleeve or the arm 21. Accordingly, easy and ready adjustment of all four wheels 20 of the mower through operation of the wheel 46 can be effected.

As previously stated herein our invention also includes means for visibly indicating the vertical adjustment of one of the wheels 20 in its mounting and, as a consequence, all four wheels of the mower, so that the user thereof can readily determine the height to which the cutting element 17 is adjusted to, in turn, determine the height at which the grass will be cut.

This indicating means comprises, in the present instance, a pair of metal elements 49, in the form of arrows, welded to opposite sides of the rod 47 adjacent the upper end thereof, and a bracket 50 having scales 51 thereon, preferably in inch graduations, and over which the arrows are adapted to be moved by and in accordance with vertical adjustment of member 30.

The bracket 50 is of L-form and its horizontal portion 52 is secured by fastening members 53 to the upper end of the sleeve 22, as best shown in Fig. 4. The vertical portion 54 of the bracket is formed with a longitudinal extending slot 55, and upon opposite sides of this slot, as well as upon opposite sides of the vertical portion (see Fig. 7) are located the scales 51.

As the bracket 50 is secured on the sleeve 22 the upper end portion of the rod is accommodated in the slot 55 and with the arrows 49 on opposite sides of the vertical portion 54. Thus, in use, when the block 30 is adjusted vertically within the sleeve 22 the rod 47 is moved vertically in relation to the bracket portion 54 so that the arrows 49 will be moved over the scales 51 to indicate the degree of adjustment of the block 30, and, hence, the degree of adjustment of all four wheels 20 of the mower. Of course, this in turn, indicates to the user the vertical adjustment of the cutting elements 17.

Since the bracket portion 54 is provided with scales on opposite sides thereof, and the arrows 49 are movable over such scales, it will be evident that the user can observe the degree of adjustment of the block 30 from either side of the portion 54.

Although we have herein shown and described only one form of lawn mower including one form of wheel-adjusting mechanism, one form of stabilizing means for the wheel-mounting means and one form for visibly indicating the degree of adjustment of the wheels, it is to be understood that various changes and modifications may be made herein without departing from the spirit of our invention and the spirit and scope of the appended claims.

What we claim is:

1. A mower, including: a chassis; an arm fixed on the chassis; a frame secured to the arm; a wheel; an axle for the wheel; a member fixed to the axle and slidably adjustable in the frame; means rotatable in the frame for adjusting the member in the frame whereby the axle and its wheel can be adjusted on the arm; an element fixed to the member and slidable in the frame for holding the member and frame against relative turning movement to prevent binding of the member in the frame and to prevent tilting of the axle.

2. A mower, including: a chassis; an arm fixed on the chassis; a frame secured to the arm; a wheel; an axle for the wheel; a member fixed to the axle and slidably adjustable in the frame; means rotatable in the frame for adjusting the member in the frame whereby the axle and its wheel can be adjusted on the arm; coacting means on the frame and member for visibly indicating the degree of adjustment of the wheel on the arm, said indicating means comprising a bracket fixed to the frame and having a measuring scale thereon, a rod fixed to the member and slidable in the frame in a path paralleling the bracket; and a pointer mounted on the rod so as to be movable over said scale by the rod.

3. A mower, including: a chassis; an arm fixed on the chassis; a frame secured to the arm; a wheel; an axle for the wheel; a member fixed to the axle and slidably adjustable in the frame; means rotatable in the frame for adjusting the member in the frame whereby the axle and its wheel can be adjusted on the arm; and coacting means on the frame and member for visibly indicating the degree of adjustment of the wheel on the arm, said indicating means comprising an L-shaped bracket having the horizontal portion thereof fixed to the frame so the vertical portion extends upwardly from the frame, said vertical portion having a slot lengthwise therein and scales on opposite sides thereof and on opposite sides of the vertical portion, and a rod fixed to the member and movable vertically in the frame and in said slot, and a pair of pointers fixed on the rod so as to be disposed to opposite sides of said vertical portion.

4. A mower, including: a chassis; an arm fixed at one end to the chassis; a sleeve secured to the other end of the arm, the sleeve of angular form in cross section and having a slot lengthwise in one side thereof; a wheel; an axle for the wheel extending through the slot; a block fixed to the axle and slidably adjustable lengthwise in the sleeve; a screw shaft journaled lengthwise in the sleeve and threaded in the block so that when rotated, adjustment of the block in the sleeve is effected to in turn adjust the axle and wheel vertically on the sleeve; and a rod slidable in the ends of the sleeve and secured between its ends in the block for holding the block and sleeve against relative twisting movement to insure ready adjustment of the block in the sleeve.

References Cited in the file of this patent

UNITED STATES PATENTS

| | | |
|---|---|---|
| 592,805 | Mason | Nov. 2, 1897 |
| 1,340,418 | Schneider | May 18, 1920 |
| 1,613,263 | Baylin | Jan. 4, 1927 |
| 1,634,803 | Spiro | July 5, 1927 |
| 2,467,592 | Morgan | Apr. 19, 1949 |
| 2,480,909 | Davis | Sept. 6, 1949 |
| 2,763,116 | Flinchbaugh | Sept. 18, 1956 |
| 2,825,196 | Gudmundsen | Mar. 4, 1958 |